United States Patent Office 2,841,582
Patented July 1, 1958

2,841,582

AMINOALKYL ESTERS OF 2-CARBOXY-2H,1,4-BENZOTHIAZIN-3(4H)-ONES

Markus Zimmermann, Evanston, Ill., assignor to G. D. Searle & Co., Chicago, Ill., a corporation of Delaware No Drawing. Application May 29, 1956
Serial No. 587,949

6 Claims. (Cl. 260—243)

This invention relates to aminoalkyl esters of 2-carboxy-2H,1,4-benzothiazin-3(4H)-one of the formula

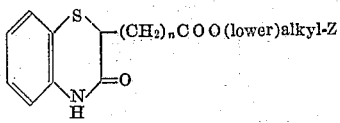

and acid addition salts thereof wherein $n$ is zero or 1 and and Z is a di(lower)alkylamino, piperidino, morpholino or pyrrolidino radical.

The compounds of the invention are prepared by reacting an appropriate aminoalkyl ester with the free acid of the formula

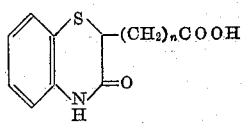

After completion of the reaction the product is isolated as desired directly in the form of the acid addition salt formed in the reaction or if desired the free basic ester is obtained by making the mixture alkaline and extracting the alkaline solution.

Suitable aminoalkyl esters are those obtained from the aminoalkanols by reaction with an appropriate acid, anhydride or the like; among them may be mentioned the halide esters, sulfate esters, acetates or the like. Preferred aminoalkyl esters are such as diethylaminoethyl chloride or bromide, dimethylaminopropyl chloride, piperidinoethyl chloride, morpholinoethyl chloride, pyrrolidinoethyl chloride and the like.

The reaction of the aminoalkyl ester with the benzothiazin acid moiety is carried out conveniently by mixing the reactants in a solvent such as isopropanol and allowing them to stand for several hours followed by a short period of refluxing. A diluent such as ethyl acetate is added and the acid addition salt obtained directly from the reaction mixture.

Alternatively, the compounds of the invention are prepared by reacting the benzothiazin acid moiety in the form of its acid halide, e. g., chloride, with the aminoalkanol in the presence of an agent such as pyridine and the like.

Alternatively, the compounds of the invention are prepared by mixing the amino alcohol acetate or the like with the benzothiazin acid moiety and an inert solvent such as toluene and distilling whereby the acetic acid is removed from the reaction zone.

Suitable acids for the preparation of non-toxic acid addition salts are e. g. hydrochloric, hydrobromic, sulfuric, citric, acetic, tartaric and the like.

The compounds of the invention have pharmaceutical utility characterized in particular by depression of the blood pressure and have utility as hypotensive agents. They may be administered orally or parenterally.

The invention is illustrated in greater detail in the examples given below which are presented by way of illustration and not limitation. Temperatures are expressed in degrees centigrade. Parts by weight bear the same relation to parts by volume as kilograms to liters.

Example 1

An ethanol solution of 23 parts by weight of ethyl bromomalonate in 20 parts by volume of ethanol is added to an ice cold solution of 12.5 parts by weight of o-aminobenzenethiol dissolved in 20 cc. of ethanol. After allowing the mixture to come to room temperature, 7.9 parts by weight of pyridine is added and the mixture warmed on the steam bath for 30 minutes. The mixture is diluted with ether, extracted with dilute hydrochloric acid, the ether extract washed with water, dried, and evaporated to remove the ether. The residue is recrystallized from aqueous ethanol to yield 2-ethoxycarbonyl-2H,1,4-benzothiazin-3(4H)-one, melting point 142–144°.

2 parts by weight of 2-ethoxycarbonyl-2H,1,4-benzothiazin-3(4H)-one is suspended in 100 parts by volume of one molar sodium hydroxide solution and stirred at room temperature until a clear solution results. The solution is made acid with hydrochloric acid and the mixture allowed to stand for one-half hour. The crystalline precipitate is filtered off, washed with water and dried to yield 2-carboxy-2H,1,4-benzothiazin-3(4H)-one, melting point 155–156°.

To a suspension of 1.8 parts by weight of 2-carboxy-2H,1,4-benzothiazin-3(4H)-one in 50 parts by volume of isopropanol is added 1.4 parts by weight diisopropylaminoethyl chloride and the mixture allowed to stand at room temperature overnight. The mixture is heated to 50–60° for an hour, about one-half of the isopropanol is removed, ethyl acetate is added and the mixture allowed to stand. The crystalline precipitate is filtered off and crystallized from ethanol-ethyl acetate to yield the hydrochloride of the 2β-diisopropylaminoethyl ester of 2-carboxy-2H,1,4-benzothiazin-3(4H)-one, melting point 175–176° with gas evolution.

By substituting diethylaminoethyl chloride for the diisopropylaminoethyl chloride used above, the hydrochloride of the corresponding diethylaminoethyl ester is obtained, melting point 158–159°.

By substituting piperidinoethyl chloride for the diisopropylaminoethyl chloride used above the hydrochloride of the corresponding piperidinoethyl ester is obtained, melting point 182–184°.

By substituting diethylaminopropyl chloride for the diisopropylaminoethyl chloride used above the hydrochloride of the corresponding diethylaminopropyl ester of 2-carboxy-2H,1,4-benzothiazin-3(4H)-one is obtained.

Example 2

To a suspension of 3.7 parts by weight of 2-carboxymethyl-2H,1,4-benzothiazin-3(4H)-one in 40 parts by volume of isopropanol is added 2.25 parts by weight of diethylaminoethyl chloride and the mixture refluxed for about 3 hours. The mixture is evaporated to dryness, the residue dissolved in water and made acid with hydrochloric acid, the acidified solution extracted with ether and then made alkaline with sodium carbonate and extracted with ether. The ether extract from the alkaline solution is dried, the ether distilled off and the residue distilled at 0.1 mm. at a bath temperature of 190°. The oily distillate is dissolved in ethyl acetate to which excess hydrogen chloride in isopropanol is added. The mixture is allowed to stand, the supernatant liquid decanted off and the residue recrystallized from ethanol-ethyl acetate to yield the hydrochloride salt of the β-diethylaminoethyl ester of 2-carboxymethyl-2H,1,4-benzothiazin-3(4H)-one, melting point 168–169°.

By substituting β-diisopropylaminoethyl chloride for the diethylaminoethyl chloride used above, there is obtained the β-diisopropylaminoethyl ester of 2-carboxymethyl-2H,1,4-benzothiazin-3(4H)-one, which was dis-distilled at 0.1 mm. and a bath temperature of 210°.

By substituting piperidinoethyl chloride for the diethylamino chloride used above there is obtained the hydrochloride of the piperidinoethyl ester of 2-carboxymethyl-2H,1,4-benzothiazin-3(4H)-one, melting point 205–207°.

Other acid addition salts such as the bromide, sulfate, citrate, tartrate and the like are prepared in a similar manner by adding to the base a solution of the desired acid and recovering the product.

*Example 3*

To a suspension of 3.7 parts by weight of 2-carboxymethyl-2H,1,4-benzothiazin-3(4H)-one in 100 parts by volume of toluene is added 4 parts by weight of diethylaminoethyl acetate and the mixture slowly distilled. When 75 parts by volume have distilled over, the reaction mixture is diluted with water, made alkaline with sodium carbonate and extracted with ether. The ether extract is dried, the ether and toluene removed and the residue distilled at 0.1 mm. at a bath temperature of 190°. The oily distillate is dissolved in ethyl acetate and a slight excess of dry hydrobromic acid in isopropanol added. After standing, the solid residue is recrystallized from ethyl acetate-isopropanol to yield the hydrobromide salt of β-diethylaminoethyl ester of 2-carboxymethyl-2H,1,4-benzothiazin-3(4H)-one.

What is claimed is:

1. A compound selected from the group consisting of compounds of the formula

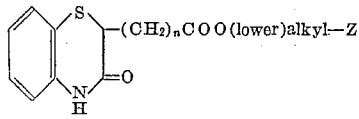

and non-toxic addition salts thereof wherein $n$ is selected from the group of numbers consisting of 0 and 1 and Z is a radical selected from the group consisting of di-(lower)-alkylamino, piperidino, pyrrolidino and morpholino.

2. A compound of the formula

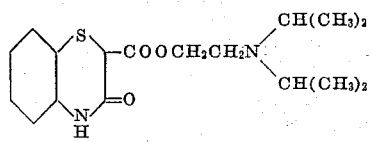

3. A compound of the formula

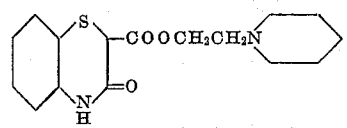

4. A compound of the formula

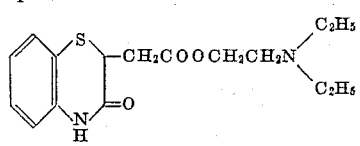

5. A compound of the formula

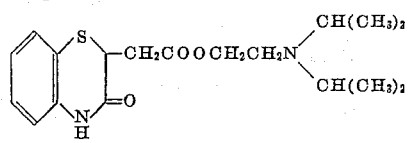

6. A compound of the formula

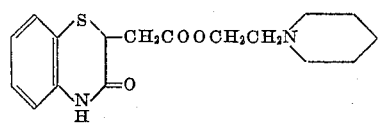

No references cited.